(12) United States Patent
Zhang et al.

(10) Patent No.: US 12,632,511 B1
(45) Date of Patent: May 19, 2026

(54) MISSING PATTERN GENERATION IN A DATA SIMULATION SYSTEM

(71) Applicant: INTERNATIONAL BUSINESS MACHINES CORPORATION, Armonk, NY (US)

(72) Inventors: Xue Ying Zhang, Xi'an (CN); Jing James Xu, Xi'an (CN); Si Er Han, Xi'an (CN); Xiao Ming Ma, Xi'an (CN); Wen Pei Yu, Xi'an (CN); Jing Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/015,043

(22) Filed: Jan. 9, 2025

(51) Int. Cl.
*G06F 16/00* (2019.01)
*G06F 16/215* (2019.01)
(Continued)

(52) U.S. Cl.
CPC ............ *G06F 18/15* (2023.01); *G06F 16/215* (2019.01); *G06F 16/2365* (2019.01);
(Continued)

(58) Field of Classification Search
CPC .... G06F 18/15; G06F 18/2113; G06F 16/215; G06F 16/2462; G06F 16/283; G06F 16/2365; G06F 16/258; G06F 16/9038; G06F 16/24554; G06F 16/35; G06N 5/04; G06N 5/025; G06N 5/022; G06N 20/00; G06N 20/10; G06N 7/005; G06N 7/01; G06N 3/088; G06N 3/049; G06N 3/08; G06N 3/0445
See application file for complete search history.

(56) References Cited

U.S. PATENT DOCUMENTS

| | | | | |
|---|---|---|---|---|
| 10,860,651 B2 * | 12/2020 | Convertino | ........... | G06F 16/215 |
| 11,422,995 B1 * | 8/2022 | Marcus | ................. | G06F 16/285 |

(Continued)

FOREIGN PATENT DOCUMENTS

| | | | | |
|---|---|---|---|---|
| EP | | 4535186 A1 * | 4/2025 | |
| WO | WO 2023003676 A1 * | | 1/2023 | |
| WO | WO 2024259083 A1 * | | 12/2024 | |

OTHER PUBLICATIONS

Elham Kalantari et al., "Evaluating traditional versus ensemble machine learning methods for predicting missing data of daily PM10 concentration", Atmospheric Pollution Research, vol. 15, Issue 5, May 2024, 102063, pp. 1-11.*

(Continued)

*Primary Examiner* — Srirama Channavajjala

(57) ABSTRACT

Systems, methods, and computer program products for generating data according to patterns of missing data. A method for automatically identifying patterns of missing data and generating data accordingly may comprise reading a plurality of values, each associated a subject and a variable; determining a count of missing values for each variable; selecting one or more variables of the plurality of variables based on their respective counts of missing values; identifying a pattern type characterizing a pattern of missing values for each of the one or more selected variables; and generating simulated data for each of the one or more selected variables based on the identified pattern types.

18 Claims, 5 Drawing Sheets

(51) Int. Cl.

| | |
|---|---|
| *G06F 16/23* | (2019.01) |
| *G06F 16/2458* | (2019.01) |
| *G06F 16/25* | (2019.01) |
| *G06F 16/28* | (2019.01) |
| *G06F 18/15* | (2023.01) |
| *G06F 18/2113* | (2023.01) |
| *G06N 3/088* | (2023.01) |
| *G06N 20/00* | (2019.01) |

(52) U.S. Cl.

CPC ........ *G06F 16/2462* (2019.01); *G06F 16/258* (2019.01); *G06F 16/283* (2019.01); *G06F 18/2113* (2023.01); *G06N 3/088* (2013.01); *G06N 20/00* (2019.01)

(56) References Cited

U.S. PATENT DOCUMENTS

| | | | | |
|---|---|---|---|---|
| 2011/0307437 | A1* | 12/2011 | Aliferis | G06N 20/00 706/46 |
| 2013/0226842 | A1* | 8/2013 | Chu | G06N 5/025 706/12 |
| 2014/0207493 | A1* | 7/2014 | Sarrafzadeh | A61B 5/7264 705/3 |
| 2014/0324752 | A1* | 10/2014 | Statnikov | G06F 17/18 706/46 |
| 2016/0117588 | A1* | 4/2016 | Muraoka | G06Q 10/06375 706/46 |
| 2019/0258743 | A1* | 8/2019 | Convertino | G06F 16/90 |
| 2021/0182602 | A1* | 6/2021 | V | G06F 18/10 |
| 2021/0374164 | A1* | 12/2021 | Ghoula | G06N 20/00 |
| 2022/0374446 | A1* | 11/2022 | Savir | G06F 16/9535 |
| 2023/0040284 | A1 | 2/2023 | Ali-Tolppa et al. | |
| 2024/0338559 | A1* | 10/2024 | Zhang | G06N 3/042 |

OTHER PUBLICATIONS

Wouter van Loon et al., "Imputation of missing values in multi-view data", Information Fusion, vol. 111, Nov. 2024, 102524 , pp. 1-18.*

Roderick J. Little, "Missing Data Analysis", Department of Biostatistics, University of Michigan, Ann Arbor, Michigan, USA; Feb. 12, 2024, pp. 149-173.*

Bechný et al. "Missing Data Patterns: From Theory to an Application in the Steel Industry", SSDBM '21: Proceedings of the 33rd International Conference on Scientific and Statistical Database Management, Aug. 11, 2021, pp. 214-219.

Poudevigne-Durance et al. "MaWGAN: A Generative Adversarial Network to Create Synthetic Data from Datasets with Missing Data", Electronics, Mar. 8, 2022, 10 pages.

Ruddle et al. "Using Set Visualisation to Find and Explain Patterns of Missing Values: A Case Study with NHS Hospital Episode Statistics Data", BMJ Open, 2022, 9 pages.

Wang et al. "Planned Missing Data Design: Through Intended Missing Data Make Research More Effective", Advances in Psychological Science, Jan. 2014, pp. 1025-1035 (22 pages), vol. 22, Issue No. 6.

Wang et al. "Preserving Missing Data Distribution in Synthetic Data", WWW'23: Proceedings of the ACM Web Conference 2023, Apr. 30, 2023, pp. 2110-2121.

Zhang Xijuan. "Tutorial: How to Generate Missing Data for Simulation Studies", Generating Missing Data, 2023, 50 pages.

International Searching Authority, "Notification of Transmittal of the International Search Report and the Written Opinion of the International Searching Authority, or Declaration," Patent Cooperation Treaty, Feb. 25, 2026, 16 pages, International Application No. PCT/EP2025/084712.

P. Vateekul et al, "Tree-Based Approach to Missing Data Imputation," 2009 IEEE International Conference on Data Mining Workshops, Miami, FL, USA, 2009, pp. 70-75, doi: 10.1109/ICDMW. 2009.92.

Samad Manar et al., "Missing value estimation using clustering and deep learning within multiple imputation framework", Knowledge-Based Systems, Aug. 5, 2022, 12 pages, vol. 249, doi: https://doi. org/10.1016/j.knosys.2022.108968.

Zhou et al., "Review for Handling Missing Data with special missing mechanism", arXiv, Apr. 7, 2024, 53 pages, doi: https:// arxiv.org/abs/2404.04905v1.

* cited by examiner

102 Read plurality of values

104 Determine count of missing values for each variable

106 Select one or more variables based on respective counts of missing values

108 Identify a pattern type characterizing a pattern of missing values

110 Generate simulated data

306

Current variable correlated with any candidate variables?
402

No

First principal component correlated with current variable?
406

No

MCAR
408

Yes

MNAR
410

Yes

Level of correlation above threshold?
404

Yes

SMD
412

No

MAR
414

MISSING PATTERN GENERATION IN A DATA SIMULATION SYSTEM

BACKGROUND

Embodiments of the present disclosure relate to data generation, and more specifically, to identifying patterns of missing data and generating data accordingly.

BRIEF SUMMARY

According to embodiments of the present disclosure, systems, methods of and computer program products for generating data according to patterns of missing data. A method for identifying patterns of missing data and generating data accordingly. Each value may be associated with one of a plurality of subjects and one of a plurality of variables. The method may comprise determining a count of missing values for each of the plurality of variables. The count of missing values may correspond to subjects not associated with any value for that variable. The method may comprise selecting one or more variables of the plurality of variables based on their respective counts of missing values. The method may comprise identifying a pattern type characterizing a pattern of missing values for each of the one or more selected variables.

Identifying the pattern type may comprise determining, for each other variable of the plurality of variables, whether the presence of a value for a selected variable is statistically independent of each of the subset of the plurality of variables. Identifying the pattern type may comprise identifying a set of associated variables. The set of associated variables may be a subset of the plurality of variables that are not statistically independent of the presence of a value for the selected variable. Identifying the pattern type may comprise identifying the pattern type for the selected variable based on the set of associated variables. The method may comprise generating simulated data for each of the one or more selected variables. The simulated data may be generated based on the identified pattern types for each of the one or more selected variables.

DETAILED DESCRIPTION

Figure 1:
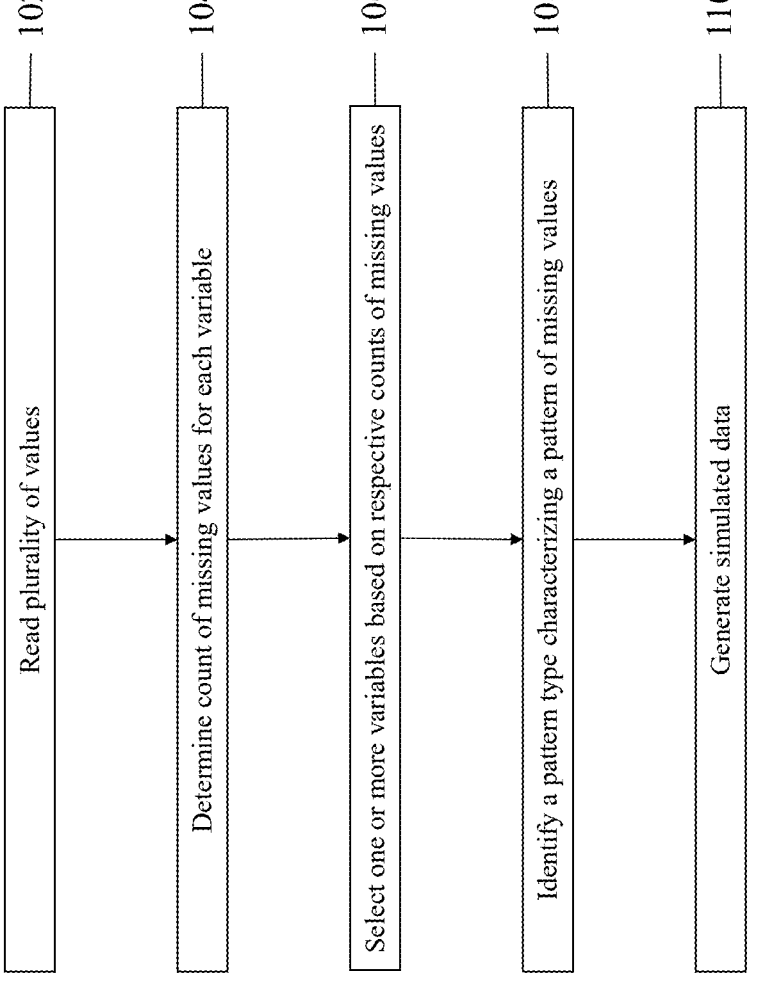
FIG. 1 is a flow diagram depicting an exemplary method for generating data according to identified patterns of missing data, in accordance with one or more embodiments of this disclosure.

Simulated data is useful in many fields because it allows for controlled, repeatable testing and analysis without relying on real-world resources or setups. Using simulated data accelerates development and reduces costs associated with physical or real-world experimentation. Further, simulated data protects sensitive or confidential information as the simulated data is not characteristic of any one real-world entity. In cases where data is simulated for maintaining confidentiality, it may not be appropriate to manually simulate data based on real datasets as this requires someone to view the confidential information. By using simulated environments, developers can explore edge cases and optimize systems without exposing proprietary data or risking security breaches. However, for simulated data to be effective, it must accurately reflect real-world conditions and behaviors, ensuring that the insights gained are valid and applicable. Further, manually simulating data is inefficient and error prone as it relies on an individual's ability to process large amounts of data.

For many fields when collecting data, it is inevitable for values to be missing. For example, in a data set exported from a customer database, data may be missing due to technical errors when constructing the data set file. As another example, in studies involving a survey, many respondents only complete some parts of the survey, leaving other questions unanswered. The systems, methods, and computer program products described herein provide a method for improving simulated data. Current methods for simulating data only reflect missing values for Structurally Missing Data. The systems, methods, and computer program products described herein enable automatic generation of simulated data that reflects missing values and the various patterns for why the values are missing. Data simulation as described herein may be based on real dataset(s).

There are four main pattern types of missing data: missing completely at random (MCAR), missing at random (MAR), missing not at random (MNAR or nonignorable), and structurally missing data (SMD). MCAR refers to variables where the probability of missing data is the same for all observations and is unrelated to any observed or unobserved data values. For example, a study is conducted where researchers are collecting data on the height of a group of individuals. During the data collection process, a few height measurements are accidentally lost or not recorded due to a technical error in the measuring device. If the loss of these height measurements is completely random and not related to the height or any other characteristics of the individuals, then it can be considered Missing Completely At Random (MCAR).

MAR refers to variables the probability of missing data depends on observed variables but not on the unobserved data. Presence of values for variables having an MNAR pattern may depend on observed data, not the missing values themselves. For example, a medical study is conducted where researchers are collecting data on patients' cholesterol levels and whether they follow a specific dietary plan. The data on cholesterol levels is missing for some participants, but it is found that the missingness is related to age, which is an observed variable. In such an example, older patients are less likely to disclose their cholesterol levels.

MNAR refers to variables where the probability of missing data is related to the unobserved data even after accounting for observed variables. Presence of values for variables having an MNAR pattern may depend on unobserved, missing values. For example, a clinical trial is conducted studying the effectiveness of a new medication for depression. Participants are required to self-report on their mood using a questionnaire at several points of time. However, some participants stop filling out the questionnaire after experiencing severe side effects from the medication. In such an example, participants experiencing severe side effects are more likely to stop reporting their mood.

SMD refers to variables where the presence of values for those variables is a result of the design of the study or data collection process. For example, values for these variables may be missing because certain values are logically undefined or inapplicable. It may not be appropriate to impute or fill in missing values in this case, as the missing data is inherent to the study design. For example, a survey is conducted to gather information about employed individuals in a company. The survey has questions about work-related habits, job satisfaction, and income. However, the company decides to exclude part-time employees from answering questions about overtime work since part-time employees are not eligible for overtime. In this scenario, the missing data (information about overtime work) is structurally missing because it is intentionally left out for a specific group of participants (part-time employees). This is not due to randomness, participant behavior, or any external factors but is a planned aspect of the survey design. Structural missing data may arise due to study design decisions, eligibility criteria, or the nature of the information being collected.

Figure 2:
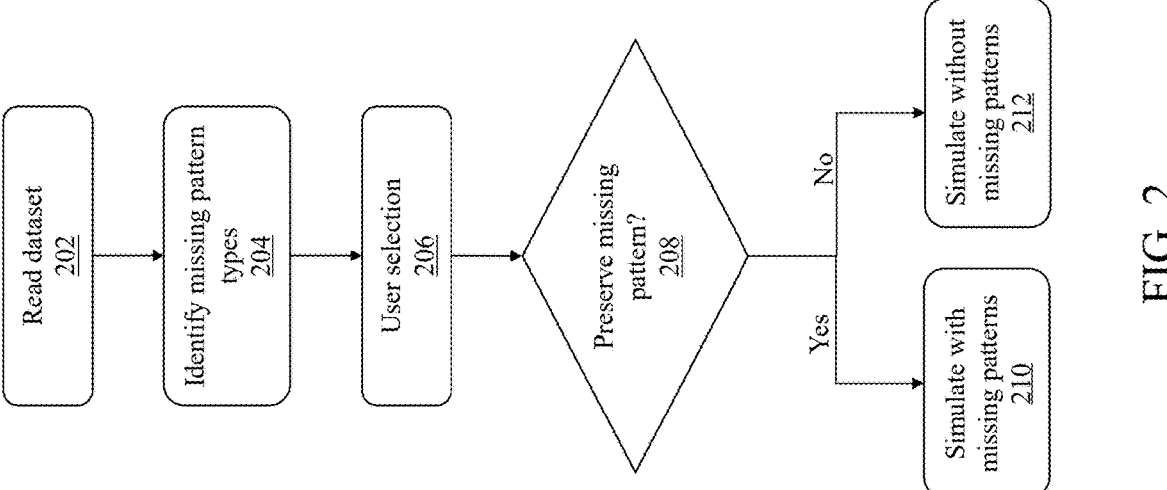
FIG. 2 is a flow diagram depicting an exemplary method for generating data according to identified patterns of missing data, in accordance with one or more embodiments of this disclosure.

Referring now to FIG. 2 a flowchart illustrating an exemplary method 200 for generating data according to identified patterns of missing data is depicted. The operations of method 200 presented below are intended to be illustrative. In some implementations, method 200 is accomplished with one or more additional operations not described and/or without one or more of the operations discussed. The operations of method 200 may be performed in another order. Additionally, the order in which the operations of method 200 are illustrated in FIG. 2 and described below is not intended to be limiting. In some implementations, method 200 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 200.

Operation 202 may comprise reading a data set. The data set may comprise one or more of a plurality of values, metadata characterizing variables, and/or other information. Each value may be associated with one of a plurality of subjects and one of a plurality of variables. The plurality of variables may comprise one or more categorical variables, one or more continuous variables, and/or one or more other variables. By way of non-limiting example, a value associated with a categorical variable and a subject is selected from a set of predetermined categories. By way of non-limiting example, a value associated with a continuous variable and a subject may be any numerical value within a range of numbers. For example, the range of numbers may include all real numbers, all positive numbers, and/or another range of numbers. In some implementations, the data set may be missing one or more values. A missing value may correspond to a subject not associated with any value for a given variable. Likewise, a missing value may correspond to a variable not associated with any value for a given subject. For example, a missing value is associated with a subject and a variable.

The metadata may characterize one or more variables of the plurality of variables. By way of non-limiting example, the data set may comprise metadata for none of, some of, and/or every one of the plurality of variables. By way of non-limiting example, the metadata identifies a missing pattern type of each of the one or more variables.

Operation 204 may comprise identifying missing pattern types for one or more of the plurality of variables. For example, a separate missing pattern type may be identified for each of the one or more of the plurality of variables. In some implementations, the missing pattern types are identified in accordance with method 204 depicted in FIG. 3.

Figure 3:
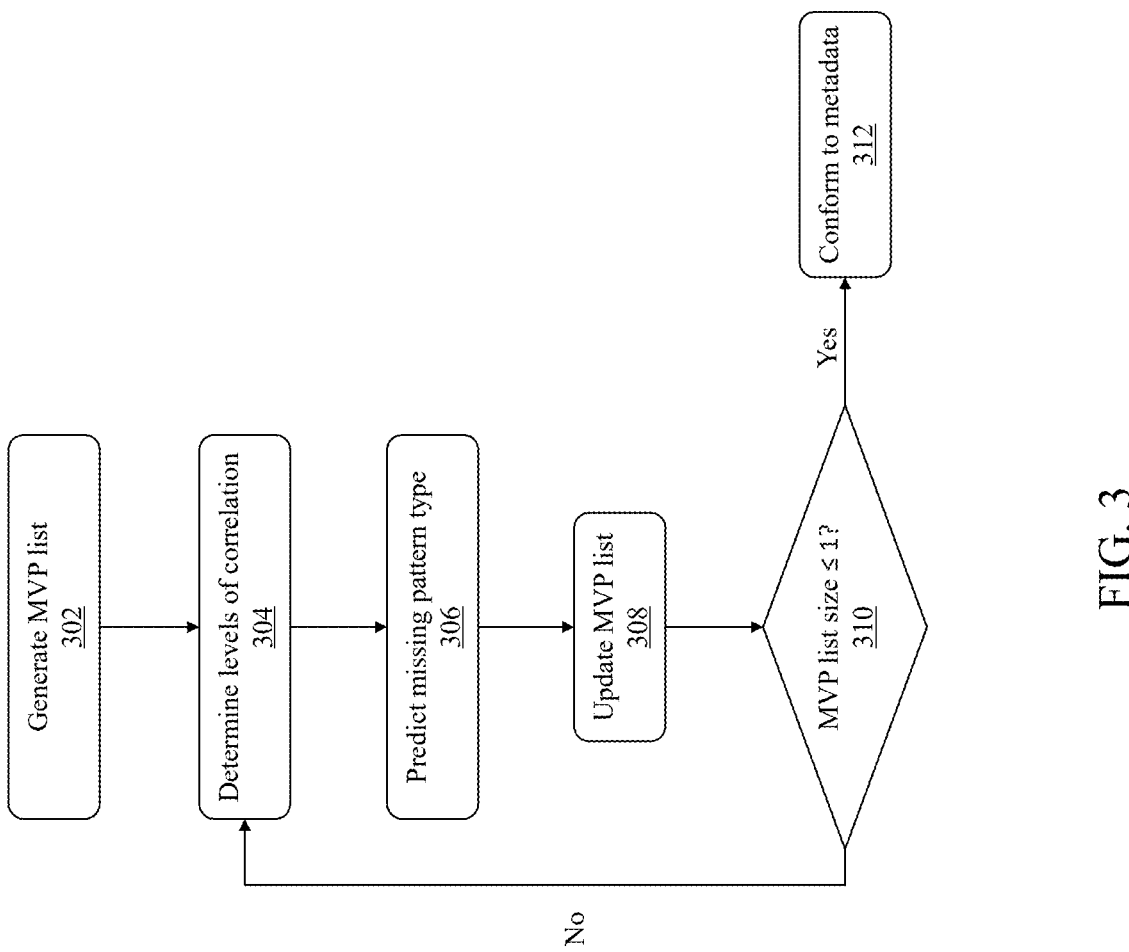
FIG. 3 is a flow diagram depicting an exemplary method for identifying pattern types of missing data, in accordance with one or more embodiments of this disclosure.

FIG. 3 is a flowchart illustrating an exemplary method 204 for identifying pattern types of missing data is depicted. The operations of method 204 presented below are intended to be illustrative. In some implementations, method 204 is accomplished with one or more additional operations not described and/or without one or more of the operations discussed. The operations of method 204 may be performed in another order. Additionally, the order in which the operations of method 204 are illustrated in FIG. 3 and described below is not intended to be limiting. In some implementations, method 204 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 204.

Operation 302 may comprise generating a missing value percentage (MVP) list. Generating the MVP list may comprise computing a missing value percentage for each variable of the plurality of variables. Determining the missing value percentage for a variable may comprise determining a count of missing values for that variable. Determining the missing value percentage for the variable may comprise determining a potential data set size. The potential data set size may indicate the number of values the data set would have if it had no missing values. For example, the potential data set size is the number of all possible subject/variable pairs. The potential data set size may be the product of the number of subjects of the plurality of subjects and the number of variables of the plurality of variables. Determining the missing value percentage for the variable may comprise dividing the count of missing values by the potential data set size.

Generating the MVP list may comprise determining a ranking of the variables of the plurality of variables. The ranking may be determined based on the missing value percentage for each variable. In some implementations, generating the MVP list comprises identifying one or more variables having a missing value percentage less than a threshold. For example, the threshold percentage is 90%. By way of non-limiting example, generating the MVP list comprises including the identified one or more variables such that the MVP list only comprises the variables having missing value percentages less than the threshold percentage. By way of non-limiting example, the MVP list comprises all variables of the plurality of variables. By way of non-limiting example, the variables in the MVP list are ranked in decreasing order of missing value percentages.

Operation 304 may comprise determining levels of correlation between a current variable (V) and one or more candidate variables. There may be one or more candidate variables. The candidate variables may be the variables of the plurality of variables other than the current variable. The candidate variables may be the variables of the MVP list other than the current variable. By way of non-limiting example, a separate level of correlation is determined for each candidate variable. Method 204 may comprise iterating through at least two of the variables of the originally generated MVP list in decreasing or increasing order of MVP. For example, iterating through the variables may comprise repeating operations 304, 306, 308, and 310. For example, the current variable is the first variable of the MVP list. The current variable may be the variable that has the highest missing value percentage that is currently in the MVP list.

Determining the levels of correlation may comprise computing a binary counterpart for the current variable. The binary counterpart may characterize missing values and present values of the data set that are associated with the current variable. For example, the binary counterpart $(V_C)$ may be defined as $V_C(i)=1$ for all V (i) that are missing from and $V_C(i)=0$ for all V (i) that are present in the data set. V (i) represents a value associated with the current variable and the $i^{th}$ subject.

Determining the levels of correlation may comprise performing one or more statistical tests. For example, the one or more statistical tests comprise a test of independence. The statistical test(s) may be performed individually for each of the candidate variables. Each test may be performed on the binary counterpart and an individual candidate variable. The statistical test(s) may comprise Pearson chi-square test, the independent sample t-test, and/or another test of independence. Different statistical tests may be used for different ones of the candidate variables. For example, the Pearson chi-square test is performed for categorical candidate variables. For example, the independent sample t-test is performed for continuous candidate variables. For example, Cramer's V and/or Hedges' g may be used for large data sets.

By way of non-limiting example, performing Pearson's chi-square test comprises constructing a missing count matrix for the current variable and a candidate variable. For example, a first dimension of the missing count matrix represents each category of the predetermined set of categories for the candidate variable. For example, the second dimension represents whether values are present in the data set or not. For example, a first row represents values included in the data set and a second row represents values not included in the data set.

For example, the missing count matrix may comprise a plurality of elements. Half of the elements of the missing count matrix may indicate a count of subjects associated with a value in the data set associated with the current variable and associated with a value of a given category associated with the candidate variable. Half of the elements of the missing count matrix may indicate a count of subjects associated with a value of a given category associated with the candidate variable and not associated with any values associated with the current variable. Each element of the first row of the missing count matrix may be a count of values included in the data set that are associated with the current variable given the value for the candidate variable identified by the row. Each element of the second row of the missing count matrix may be a count of values missing from the data set that are associated with the current variable given the value for the candidate variable identified by the row.

Pearson's chi-square test may be performed based on the missing count matrix. For example, the null hypothesis used for the statistical test(s) is that there is no missing pattern between the current variable and the candidate variable is used. For example, the p-value used may be 0.05 and/or another value.

Performing the statistical test(s) may comprise determining whether the binary counterpart and the candidate variable are independent variables. For example, if the resulting p-value is sufficiently small (e.g., less than and/or equal to 0.05), it is determined there is a missing pattern between the current variable and the candidate variable. For example, if the resulting p-value is too large (e.g. greater than and/or equal to 0.05), it is determined that there is no missing pattern between the current variable and the candidate variable.

Determining the levels of correlation may comprise computing the correlation effect size between the current variable and each of the one or more candidate variables. A separate correlation effect size may be determined for each of the one or more candidate variables. The one or more candidate variables may comprise candidate values that are not statistically independent of presence of the current variable. In some implementations, the correlation effect size(s) may be computed responsive to determining the binary counterpart and the candidate variable are not independent.

For example, the correlation effect size is computed using one or more of Cramer's V, Hedges' g, Pearson's r, Spearman's p, Kendall's t, Coefficient of Determination $(r^2)$, Phi Coefficient $(\phi)$, Cramer's V, Eta Squared $(\eta^2)$, Point-Biserial Correlation, Tetrachoric Correlation, Goodman, Kruskal's Gamma, and/or another correlation effect size measure. Different correlation effect size computations may be used for different ones of the candidate variables. For example, Cramer's V is computed for categorical candidate variables. For example, Hedges' g is computed for continuous candidate variables. For example, Cramer's Vis computed for candidate variables having two or more categories in its predetermined set of categories. In some implementations, the correlation effect sizes are levels of correlation. For example, a negative correlation effect size indicates the current variable and a candidate variable are inversely correlated. By way of non-limiting example, the magnitudes of the levels of correlation may characterize strength of correlation between presence of the current variable and the one or more candidate variables.

Determining the levels of correlation may comprise determining the absolute value or magnitudes of each of the correlation effect sizes. In some implementations, the absolute values are the levels of correlation. Higher levels of correlation may indicate a stronger correlation between the presence of the current variable and the one or more candidate variables.

Operation 306 may comprise predicting a missing pattern type of the current variable. By way of non-limiting example, the missing pattern type is determined based on the levels of correlation. In some implementations, the missing pattern types are predicted in accordance with method 400 depicted in FIG. 4.

Figure 4:
FIG. 4 is a flow diagram depicting an exemplary method for identifying a pattern of missing data for a variable, in accordance with one or more embodiments of this disclosure.

FIG. 4 is a flowchart illustrating an exemplary method 306 for predicting a pattern of missing data for a variable is depicted. The operations of method 306 presented below are intended to be illustrative. In some implementations, method 306 is accomplished with one or more additional operations not described and/or without one or more of the operations discussed. The operations of method 306 may be performed in another order. Additionally, the order in which the operations of method 306 are illustrated in FIG. 4 and described below is not intended to be limiting.

In some implementations, method 306 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 306. In some implementations, the operations of method 306 are performed with regard to layers of an artificial neural network rather than individual nodes.

Operation 402 may comprise determining whether the current variable is correlated with any candidate variables. The determination may be based on the test of independence performed for the current variable. For example, a determination that the current variable is correlated with any candidate variables comprises determining the binary counterpart and at least one candidate variable are not statistically independent. For example, a determination that the current variable is not correlated with any candidate variables comprises determining the binary counterpart is statistically independent of all other candidate variables.

Operation 404 may comprise determining whether the current variable is correlated with a candidate variable at a level of correlation above a threshold. Operation 404 may be performed responsive to determining the current variable is correlated with at least one candidate variable at operation 402. Operation 404 may comprise comparing each of the correlation effect sizes to the threshold. In some implementations, the threshold is any number in the inclusive range of 0 to 1. For example, the threshold is 0.6. Operation 404 may comprise identifying any, some, or all candidate variables correlated with the current variable at a level of correlation determined to be above a threshold.

Operation 412 may comprise identifying the missing pattern type of the current variable as structurally missing data (SMD). The missing pattern type may be identified as SMD responsive to determining the current variable is correlated with a candidate variable at a level of correlation greater than or equal to a threshold. Operation 412 may comprise identifying there is a missing pattern between the current variable and a selected candidate variable. The selected candidate variable may have been identified at operation 404. By way of non-limiting example, the selected candidate variable may be the candidate value identified at operation 404 having the lowest missing value percentage.

Operation 412 may comprise identifying the missing pattern type of the current variable as missing at random (MAR). The missing pattern type may be identified as MAR responsive to determining the current variable is correlated with a candidate variable at a level of correlation less than or equal to the threshold. Operation 412 may comprise selecting a candidate variable. The selected candidate variable may have been identified at operation 404. Operation 412 may comprise identifying there is a missing pattern between the current variable and a selected candidate variable. By way of non-limiting example, the selected candidate variable may be the candidate value not identified at operation 404 that has the lowest missing value percentage.

Operation 406 may be performed responsive to determining the current variable is not correlated with at least one candidate variable at operation 402. Operation 406 may comprise performing principal component analysis on the candidate variables to generate the first principal component. Operation 406 may comprise performing a test of independence on the binary counterpart and the first principal component. For example, the statistical test may be Pearson chi-square test, the independent sample t-test, and/or another test of independence. For example, the null hypothesis used for the statistical test is that there is no missing pattern between the current variable and the candidate variable is used. For example, the p-value used may be 0.05 and/or another value. By way of non-limiting example, a level of correlation between the first principal component and the current variable may be computed in addition to and/or instead of the test of independence.

Operation 406 may comprise determining whether the first principal component is correlated with the current variable based on the test of independence. Operation 408 may comprise identifying the missing pattern type of the current variable as missing not at random (MNAR). The missing pattern type may be identified as MCAR responsive to determining the current variable is not correlated with the first principal component. Operation 410 may comprise identifying the missing pattern type of the current variable as missing completely at random (MNAR). The missing pattern type may be identified as MCAR responsive to determining the current variable is correlated with the first principal component.

Referring back to FIG. 3, operation 308 may comprise updating the MVP list. Updating the MVP list may comprise removing the current variable from the MVP list. Operation 310 may comprise determining whether there is at most one variable in the MVP list. Method 204 may be repeated responsive to determining there are at least 2 variables currently in the MVP list. The repetition of method 204 for the updated MVP list may begin at operation 304.

Operation 312 may comprise reading the metadata. Operation 312 may comprise identifying differences between missing pattern types identified in the metadata and the identified pattern types. By way of non-limiting example, variables having an identified missing pattern type different than the missing pattern type identified in the metadata for those variables are identified. Operation 312 may comprise generating an indication of the differences. The indication may characterize the missing pattern type identified in the metadata, the identified missing pattern type, a recommendation for conformance, an explanation why conformance is necessary, a reason for the difference, and/or other information.

The indication may comprise natural language descriptions. For example, the indication comprises a description of the identified missing pattern type, a description of the missing pattern type identified in the metadata, and an explanation of conformation. For example, the indication comprises a portion of text associated with the identified pattern type and another portion of text associated with the pattern type identified in the metadata. These portions of text may be concatenated in the indication. Exemplary portions of text associated with the pattern type identified in the metadata are presented in Table 1 below. Exemplary portions of text associated with the identified pattern type are presented in Table 2 below. Operation 312 may comprise presenting the indication to a user. The indication may be presented via a user interface on a client computing platform.

TABLE 1

| | |
|---|---|
| MNAR | Missing Not At Random (MNAR) usually presents no correlation to another known variable, but has significant correlation with unknown variables. |
| MCAR | Missing Completely At Random (MCAR) usually presents no significant correlation to any other variable. |
| SMD | Structurally Missing Data (SMD) usually presents very strong correlation to another known variable. |
| MAR | Missing At Random (MAR) usually presents moderate correlation to another known variable. |

TABLE 1-continued

TABLE 2

| | |
|---|---|
| MNAR | However, here association is detected between this variable and a hidden variable, which implies Missing Not At Random (MNAR). |
| MCAR | However, here we haven't detected significant correlation on any observed or hidden variables. This implies Missing Completely At Random (MCAR). |
| SMD | However, here we detected significant and strong correlation on an observed variable. This implies Structurally Missing Data (SMD). |
| MAR | However, here we detected significant and moderate correlation on an observed variable. This implies Missing At Random (MAR). |

Operation 312 may comprise conforming the identified missing pattern type to the metadata based on the difference. An exemplary variable has an identified missing pattern type of SMD but the metadata for the exemplary variable identifies the missing pattern type as MAR. Operation 312 may comprise conforming the identified missing pattern type of the exemplary variable to MAR. Operation 312 may comprise conforming the identified missing pattern type of the exemplary variable to MAR. A second exemplary variable has an identified missing pattern type of MAR but the metadata for the exemplary variable identifies the missing pattern type as SMD. Operation 312 may comprise conforming the identified missing pattern type of the exemplary variable to SMD. Conforming the identified missing pattern type may comprise identifying the conformed type in lieu of the previously identified type. For example, the identified missing pattern type may be presented to the user via the user interface after conformance.

Referring back to FIG. 2, operation 206 may comprise reading user input characterizing a selection of a missing pattern type. The user input may have been provided by the user via the user interface. For example, the user interface enables the user to select either the identified missing pattern type or the missing pattern type identified in the metadata. For example, the user interface enables the user to select any of the missing pattern types. For example, the user interface enables the user to identify, for a given variable, another variable with which the given variable has a missing value pattern. The user interface may enable the user to identify whether to preserve missing value patterns in simulated data. For example, the user interface enables the user to provide input associated with none, some, or all of the variables.

Operation 208 may comprise determining whether to preserve the missing patterns. The determination may be based on the selected missing pattern type. The determination may comprise reading user input indicating whether to preserve the missing pattern. By way of non-limiting example, simulating data without preserving the missing pattern comprises simulating the data set such that there are no missing values in the simulated data set. By way of non-limiting example, the determination of operation 208 may be performed separately for each variable. By way of non-limiting example, the determination of operation 208 may be performed once, applying to all variables to be simulated (and/or each of the one or more variables).

Operation 210 may comprise simulating data for variables with missing value patterns. For example, operation 210 may be performed for each of the variables selected for missing pattern preservation at operation 208. Operation 210 may be performed after determining to preserve each of the missing patterns. By way of non-limiting example, preserving the missing pattern comprises selectively simulating certain values in accordance with the missing pattern.

Simulating an MCAR pattern for a variable V may comprise simulating data associated with each subject. Simulating the MCAR pattern for an individual subject may comprise randomly drawing a number from the standard uniform distribution for each subject. For example, the number drawn may be indicated by $X \sim U(0,1)$. The standard uniform distribution is a uniform distribution having a minimum of 0 and a maximum of 1. Accordingly, X is a standard uniform random variable having a probability density function $f(x)=1$ for $0 \leq x \leq 1$ or for $0 < x < 1$. Simulating the MCAR pattern for an individual subject may comprise determining whether X is less than the p, where p is defined as the MVP for V in decimal form. Simulating the MCAR pattern for an individual subject may comprise associating the subject and variable V with a missing value. The missing value may be associated responsive to determining X is less than p. Accordingly, no value may be generated in association with the subject and V for $X \geq p$. By way of non-limiting example, the probability that any simulated value for V is missing is equivalent to p.

Simulating the MCAR pattern for an individual subject may comprise generating a simulated value associated with the subject and variable V. The value may be generated responsive to determining X is at least p. Generating simulated values associated with V may comprise fitting the original data associated with V to a parametric statistical distribution. For example, the statistical distribution may be normal, exponential, gamma, uniform, or another distribution. Fitting the original data associated with V may comprise selecting the statistical distribution most closely representative of the values associated with V. Generating the simulated value may comprise randomly selecting a value from the statistical distribution. Generating the simulated value may comprise associating the selected value with V and the subject.

Simulating data for a variable with an SMD or an MAR pattern for variable V with another variable ($V_r$) may comprise determining a missing value percentage for each category of $V_r$. Simulating the data for a continuous $V_r$ may comprise applying binning to $V_r$. The binning may be equal frequency binning, equal width binning, and/or another type of binning. After binning, a continuous $V_r$ may be considered as a categorical variable. The bins of $V_r$ may be considered as categories of $V_r$. For a categorical $V_r$, the categories of $V_r$ may be the categories of its predetermined set of categories. Simulating the data may comprise determining a missing value percentage (MVP) for each category of $V_r$. The MVP for a category C of $V_r$ may be denoted as $P_c$. Determining $P_c$ may comprise identifying a subset of the subjects associated with values of $V_r$ equivalent to the individual category. Determining Pe may comprise identifying the number of subjects in the subset not associated with a value for V. Determining $P_c$ may comprise dividing the number of subjects in the subset not associated with a value for V by the total number of subjects in the subset. As such, the MVP for a category C of $V_r$ (i.e., $P_c$) characterizes the percentage of values of V that are missing given category C of $V_r$.

Simulating the SMD or MAR pattern for an individual subject may comprise randomly drawing a number (X) from the standard uniform distribution for each subject. Simulating the SMD or MAR pattern for an individual subject may comprise determining whether X is less than $P_c$. Simulating the SMD or MAR pattern for an individual subject may comprise associating the subject and variable V with a missing value. The missing value may be associated responsive to determining X is less than $P_c$. By way of non-limiting example, the probability that any simulated value for V is missing is equivalent to Pe for V associated with a subject that is also associated with a category C of $V_r$. Simulating the SMD or MAR pattern for an individual subject may comprise generating a simulated value associated with the subject and variable V. The value may be generated responsive to determining X is at least $P_c$.

Simulating the MNAR pattern for variable V may comprise performing principal component analysis (PCA) using some or all variables. For example, PCA is performed for all variables other than V. Performing PCA may generate the first principal component ($P_1$). Simulating the MNAR pattern for variable V may comprise simulating data according to the method for simulating an SMD or an MAR pattern for variable V as described herein. For example, when simulating the MNAR pattern, the method may consider $P_1$ to be a continuous $V_r$ as used for simulating an SMD or an MAR pattern.

Operation 212 may comprise simulating the values of the data set without simulating missing values. Operation 212 may be performed responsive to determining not to preserve the missing patterns. Operation 212 may comprise generating a simulated value associated with the subject and variable V. Operation 212 may comprise generating simulated values for each pairing of a subject and a variable. Accordingly, a simulated value may be generated for all variables and all subjects. For example, the simulated data set does not have any missing values. In some implementations, the simulated data set may have one or more missing values. In such implementations, the missing values are not identified in accordance with any missing value patterns.

Referring now to FIG. 1 a flowchart illustrating an exemplary method 100 for generating data according to identified patterns of missing data is depicted. The operations of method 100 presented below are intended to be illustrative. In some implementations, method 100 is accomplished with one or more additional operations not described and/or without one or more of the operations discussed. The operations of method 100 may be performed in another order. Additionally, the order in which the operations of method 100 are illustrated in FIG. 1 and described below is not intended to be limiting.

Operation 102 may comprise reading a plurality of values. Each value may be associated with one of a plurality of subjects and one of a plurality of variables.

Operation 104 may comprise determining a count of missing values for each of the plurality of variables. The count of missing values may correspond to subjects not associated with any value for that variable.

Operation 106 may comprise selecting one or more variables of the plurality of variables based on their respective counts of missing values. Selecting the one or more variables may comprise identifying an associated missing value percentage for each variable based on one or more of the count of missing values for that variable, the quantity of subjects of the plurality of subjects, and/or other information. The one or more variables selected may have associated missing value percentages of at most a sparsity threshold. In some implementations, operation 106 may comprise ranking the one or more selected variables based on the associated missing value percentages.

Operation 108 may comprise identifying a pattern type characterizing a pattern of missing values. A separate pattern type may be identified for each of the one or more selected variables. Identifying the pattern type for a selected variable may comprise determining the presence of a value for a selected variable is statistically independent of each of the subset of the plurality of variables. Identifying the pattern type may comprise identifying a set of associated variables. The set of associated variables may be a subset of the plurality of variables that are not statistically independent of the presence of a value for the selected variable. Identifying the pattern type may comprise identifying the pattern type for the selected variable based on the set of associated variables.

In some implementations, identifying the pattern type comprises determining an associated level of correlation for each variable of the set of associated variables. An individual associated level of correlation for an associated variable may characterize the level of associated between that associated variable and the presence of a value for the one or more selected variables. In some implementations, identifying the pattern type comprises identifying a subset of the set of associated variables. Each associated variable of the subset of associated variables may have an associated level of correlation of at least a first correlation threshold. Identifying the pattern type may comprise identifying a strongly correlated variable of the subset of associated variables having an associated level of correlation of at least a second correlation threshold. By way of non-limiting example, the pattern type is identified as structurally missing data responsive to identifying the strongly correlated variable.

In some implementations, identifying the pattern type comprises determining the associated levels of correlation for all variables of the subset of associated variables are less than a second correlation threshold. By way of non-limiting example, the pattern type may be identified as missing at random responsive to determining the associated levels of correlation for all variables of the subset of associated variables are less than the second correlation threshold.

By way of non-limiting example, the set of associated variables is an empty set. In such an example, identifying the pattern type comprises performing principal component analysis on at least one of the one or more selected variables to identify the first principal component. In some implementations, identifying the pattern type comprises determining whether the first principal component and the presence of a value for that selected variable are not statistically independent. In cases where they are statistically independent, the pattern type may be identified as missing not at random. In cases where they are statistically independent, the pattern type may be identified as missing completely at random.

Operation 106 may comprise generating simulated data for each of the one or more selected variables. The simulated data may be generated based on the identified pattern types for each of the one or more selected variables. Generating simulated data may comprise determining whether to generate a value for each variable/subject pair. Determining whether to generate a value for a variable and subject pair may comprise randomly selecting a value from the standard uniform distribution. The generation determination may comprise determining whether the selected value is at least a target probability. The generation determination may comprise determining to generate a missing value responsive to determining the selected value is at least the target probability. Generating simulated data may comprise assigning a missing value to the variable/subject pair responsive to determining the selected value is at most (or less than) the target probability.

For variables with an MCAR pattern, the target value may be generated based on the count of missing values for the variable being simulated. For example, the target value for a variable with an MCAR pattern being simulated is the MVP for that variable. For variables with an MAR or SMD pattern with a categorical variable, the generation determination may comprise identifying a category of the categorical variable associated with the subject. The generation determination may comprise determining a count of subjects associated with that category. The generation determination may comprise determining a count of subjects associated with that category and no value for the variable. The target probability may be the missing value percentage for the variable for subjects associated with that category of the categorical variable. For variables with an MAR or SMD pattern with a continuous variable, the generation determination may comprise organizing each value associated with the continuous variable into a plurality of bins. The bins may be considered as categories of the continuous variable. As such, the continuous variable may be treated as a categorical variable.

For variables with a MNAR pattern, the generation determination may comprise performing principal component analysis on the other variables to identify the first principal component. The generation determination may comprise organizing the first principal component into a plurality of bins. As such, the first principal component may be treated as a categorical variable with which the variable has an SMD or MAR pattern.

In some implementations, method 100 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 100. In some implementations, the operations of method 100 are performed with regard to layers of an artificial neural network rather than individual nodes.

Figure 5:
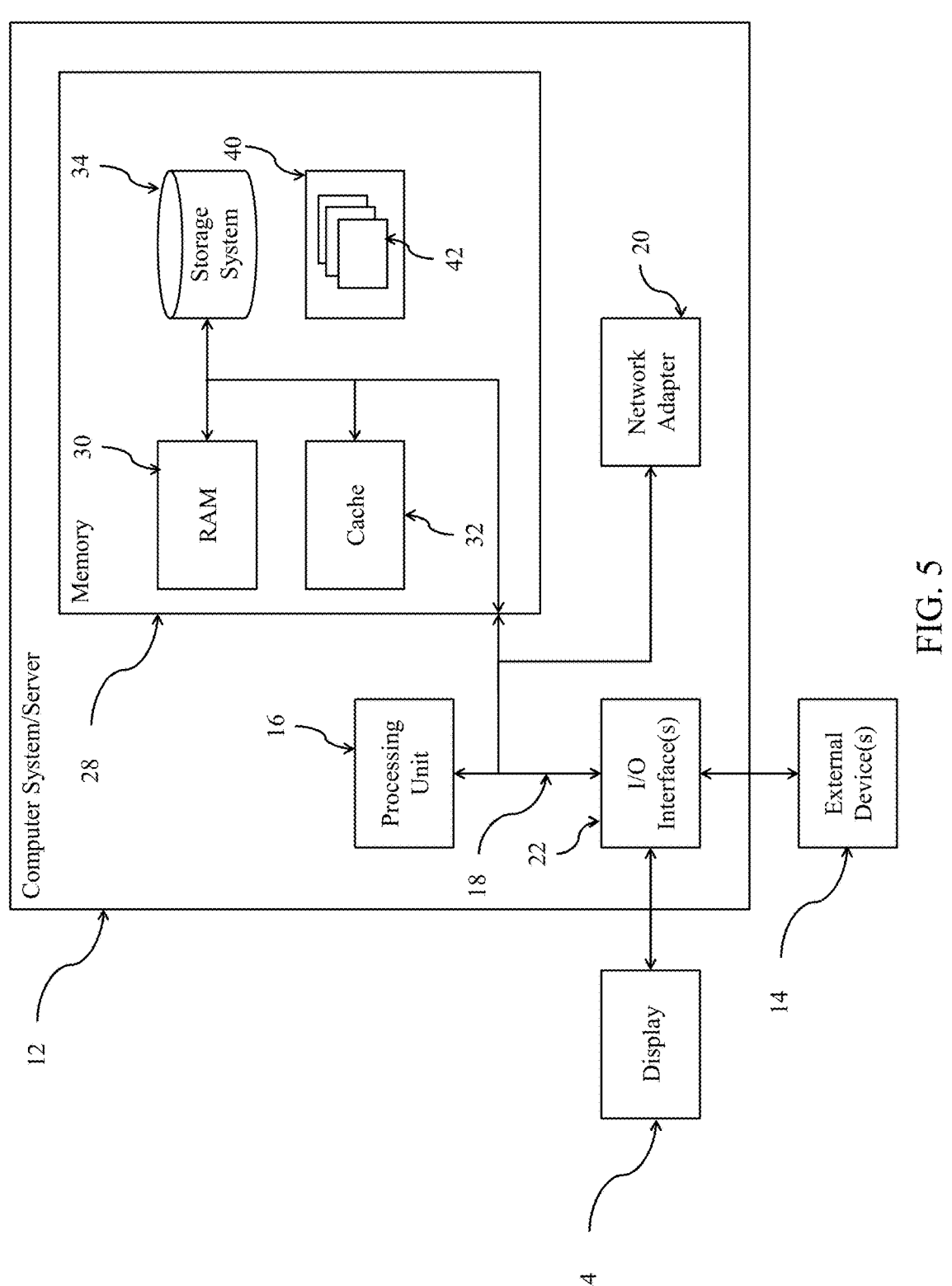
FIG. 5 depicts a computing node according to an embodiment of the present disclosure.

Referring now to FIG. 5, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for simulating data, the method comprising:

reading a plurality of values, the plurality of values being associated with a plurality of subjects and a plurality of variables, each value being associated with one subject of the plurality of subjects and one variable of the plurality of variables;

determining a plurality of counts of missing values, the plurality of counts being associated with the plurality of variables, each count being based on one or more subjects not associated with any value for a corresponding variable of the plurality of variables;

selecting one or more variables of the plurality of variables based on the plurality of counts of missing values associated with the plurality of variables, thereby producing one or more selected variables, further comprising:

computing, for each variable of the plurality of variables, an associated missing value percentage based on a corresponding count of missing values of the plurality of counts of missing values and a quantity of subjects of the plurality of subjects; and selecting the one or more variables of the plurality of variables having associated missing value percentages that satisfy a sparsity threshold;

identifying, for each selected variable of the one or more selected variables, a corresponding pattern type characterizing a pattern of missing values for the selected variable, wherein said identifying comprises:

determining whether a presence of a value for the selected variable is statistically independent of variables of the plurality of variables other than the selected variable, identifying a set of associated variables, wherein the set of associated variables is a subset of the plurality of variables that are not statistically independent of the presence of a value for the selected variable, identifying the corresponding pattern type for the selected variable based on the set of associated variables, determining that the set of associated variables comprises at least one variable, determining, for each associated variable of the set of associated variables, an associated level of correlation between the associated variable and the presence of a value for the selected variable, identifying a subset of the set of associated variables, wherein each associated variable of the subset of the set of associated variables has an associated level of correlation of at least a first correlation threshold, and identifying the corresponding pattern type as structurally missing data responsive to identifying the subset of the set of associated variables; and generating simulated data for each of the one or more selected variables based on the corresponding pattern type.

2. The computer-implemented method of claim 1, wherein the selecting of the one or more variables of the plurality of variables based on the plurality of counts of missing values associated with the plurality of variables further comprises:

ranking one or more selected variables of the plurality of variables based on a corresponding associated missing value percentage.

3. The computer-implemented method of claim 1, wherein said identifying, for each selected variable of the one or more selected variables, the corresponding pattern type characterizing the pattern of missing values for the selected variable further comprises:

identifying a strongly correlated variable of the subset of associated variables, wherein the strongly correlated variable has an associated level of correlation of at least a second correlation threshold; and determining the corresponding pattern type as structurally missing data responsive to identifying the strongly correlated variable.

4. The computer-implemented method of claim 1, wherein said identifying, for each selected variable of the one or more selected variables, the corresponding pattern type characterizing the pattern of missing values for the selected variable further comprises:

determining an associated variable of a subset of the set of associated variables, wherein the associated variable has an associated level of correlation of less than a second correlation threshold; and identifying the corresponding pattern type as missing at random responsive to determining that the associated variable has the associated level of correlation of less than the second correlation threshold.

5. The computer-implemented method of claim 1, wherein said identifying, for each selected variable of the one or more selected variables, the corresponding pattern type characterizing the pattern of missing values for the selected variable further comprises:

determining that the set of associated variables is an empty set; and performing principal component analysis on at least one of the one or more selected variables to identify a first principal component.

6. The computer-implemented method of claim 5, wherein said identifying, for each selected variable of the one or more selected variables, the corresponding pattern type characterizing the pattern of missing values for the selected variable further comprises:

determining that the first principal component and the presence of a value for the selected variable are not statistically independent; and identifying the corresponding pattern type as missing not at random.

7. The computer-implemented method of claim 5, wherein said identifying, for each selected variable of the one or more selected variables, the corresponding pattern type characterizing the pattern of missing values for the selected variable further comprises:

determining that the first principal component and the presence of a value for the selected variable are statistically independent; and identifying the corresponding pattern type as missing completely at random.

8. The computer-implemented method of claim 1, wherein said generating simulated data for each of the one or more selected variables based on the corresponding pattern type comprises:

randomly selecting a random number from a standard uniform distribution for a subject of the plurality of subjects;

determining that the random number is at least a target probability; and generating, as part of the simulated data, a value associated with the subject of the plurality of subjects and a selected variable of the one or more selected variables responsive to determining that the random number is at least the target probability.

9. The computer-implemented method of claim 8, wherein said generating simulated data for each selected variable of the one or more selected variables based on the corresponding pattern type further comprises:

determining the target probability based on a count of subjects of the plurality of subjects not associated with any value for the selected variable.

10. The computer-implemented method of claim 8, wherein said generating simulated data for each selected variable of the one or more selected variables based on the corresponding pattern type further comprises:

identifying an associated variable of the set of associated variables identified for the selected variable;

determining a pattern count corresponding to a number of subjects of the plurality of subjects that are associated with a value of the associated variable equivalent to a particular value and not associated with any value for the selected variable; and determining the target probability based on the pattern count.

11. The computer-implemented method of claim 10, wherein said generating simulated data for each selected variable of the one or more selected variables based on the corresponding pattern type further comprises:

determining that the associated variable is a continuous variable; and organizing values associated with the associated variable into a plurality of bins, wherein values within each bin are treated as equivalent.

12. The computer-implemented method of claim 8, wherein said generating simulated data for each selected variable of the one or more selected variables based on the corresponding pattern type further comprises:

performing principal component analysis on variables of the plurality of variables other than the selected variable to identify a first principal component; and organizing values associated with the first principal component into a plurality of bins, wherein values within each bin are treated as equivalent.

13. The computer-implemented method of claim 1, wherein the corresponding pattern type identified for each selected variable of the one or more selected variables is selected from the group comprising structurally missing data.

14. A computer program product comprising:

one or more computer-readable storage media; and program instructions stored on the one or more computer-readable storage media to perform operations comprising:

reading a plurality of values, the plurality of values being associated with a plurality of subjects and a plurality of variables, each value being associated with one subject of the plurality of subjects and one variable of the plurality of variables;

determining a plurality of counts of missing values, the plurality of counts being associated with the plurality of variables, each count being based on one or more subjects not associated with any value for a corresponding variable of the plurality of variables;

selecting one or more variables of the plurality of variables based on the plurality of counts of missing values associated with the plurality of variables, thereby producing one or more selected variables, further comprising:

computing, for each variable of the plurality of variables, an associated missing value percentage based on a corresponding count of missing values of the plurality of counts of missing values and a quantity of subjects of the plurality of subjects; and selecting the one or more variables of the plurality of variables having associated missing value percentages that satisfy a sparsity threshold;

identifying, for each selected variable of the one or more selected variables, a corresponding pattern type characterizing a pattern of missing values for the selected variable, wherein said identifying comprises:

determining whether a presence of a value for the selected variable is statistically independent of variables of the plurality of variables other than the selected variable, identifying a set of associated variables, wherein the set of associated variables is a subset of the plurality of variables that are not statistically independent of the presence of a value for the selected variable, identifying the corresponding pattern type for the selected variable based on the set of associated variables, determining that the set of associated variables comprises at least one variable, determining, for each associated variable of the set of associated variables, an associated level of correlation between the associated variable and the presence of a value for the selected variable, identifying a subset of the set of associated variables, wherein each associated variable of the subset of the set of associated variables has an associated level of correlation of at least a first correlation threshold, and identifying the corresponding pattern type as structurally missing data responsive to identifying the subset of the set of associated variables; and generating simulated data for each of the one or more selected variables based on the corresponding pattern type.

15. The computer program product of claim 14, wherein the operations further comprise:

ranking the one or more selected variables based on the associated missing value percentages.

16. The computer program product of claim 14, wherein the operations further comprise:

determining that a set of associated variables identified for a selected variable of the one or more selected variables is an empty set; and responsive to determining that the set of associated variables is an empty set, performing principal component analysis on at least one of the one or more selected variables to identify a first principal component.

17. The computer program product of claim 14, wherein the operations further comprise:

randomly selecting a random number from a standard uniform distribution for a subject of the plurality of subjects;

determining that the random number is at least a target probability; and generating, as part of the simulated data, a value associated with the subject of the plurality of subjects and a selected variable of the one or more selected variables responsive to determining that the random number is at least the target probability.

18. A computer system comprising:

a processor set;

one or more computer-readable storage media; and program instructions stored on the one or more computer-readable storage media to perform operations comprising:

reading a plurality of values, the plurality of values being associated with a plurality of subjects and a plurality of variables, each value being associated with one subject of the plurality of subjects and one variable of the plurality of variables;

determining a plurality of counts of missing values associated with the plurality of variables, the plurality of counts being associated with the plurality of variables, each count being based on one or more subjects not associated with any value for a corresponding variable of the plurality of variables;

selecting one or more variables of the plurality of variables based on the plurality of counts of missing values associated with the plurality of variables, thereby producing one or more selected variables, further comprising:

computing, for each variable of the plurality of variables, an associated missing value percentage based on a corresponding count of missing values of the plurality of counts of missing values and a quantity of subjects of the plurality of subjects; and selecting the one or more variables of the plurality of variables having associated missing value percentages that satisfy a sparsity threshold;

identifying, for each selected variable of the one or more selected variables, a corresponding pattern type characterizing a pattern of missing values for the selected variable, wherein said identifying comprises:

determining whether a presence of a value for the selected variable is statistically independent of variables of the plurality of variables other than the selected variable, identifying a set of associated variables, wherein the set of associated variables is a subset of the plurality of variables that are not statistically independent of the presence of the value for the selected variable, identifying the corresponding pattern type for the selected variable based on the set of associated variables, determining that the set of associated variables comprises at least one variable;

determining, for each associated variable of the set of associated variables, an associated level of correlation between that associated variable and the presence of a value for the selected variable, identifying a subset of the set of associated variables, wherein each associated variable of the subset of the set of associated variables has an associated level of correlation of at least a first correlation threshold, and identifying the corresponding pattern type as structurally missing data responsive to identifying the subset of the set of associated variables; and generating simulated data for each of the one or more selected variables based on the corresponding pattern type.

* * * * *